United States Patent
Inoue et al.

(10) Patent No.: US 12,499,189 B2
(45) Date of Patent: Dec. 16, 2025

(54) METHOD FOR DETERMINING AUTHENTICITY OF RECORDING MEDIUM AND RECORDING MEDIUM

(71) Applicant: Panasonic Intellectual Property Management Co., Ltd., Osaka (JP)

(72) Inventors: Shinji Inoue, Osaka (JP); Yusuke Shimizu, Osaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 213 days.

(21) Appl. No.: 18/374,743

(22) Filed: Sep. 29, 2023

(65) Prior Publication Data
US 2024/0028674 A1    Jan. 25, 2024

Related U.S. Application Data

(63) Continuation of application No. PCT/JP2021/047588, filed on Dec. 22, 2021.
(Continued)

(51) Int. Cl.
*G06F 21/30* (2013.01)
*G06F 3/14* (2006.01)
(Continued)

(52) U.S. Cl.
CPC ............... *G06F 21/30* (2013.01); *G06F 3/14* (2013.01); *G06F 21/6209* (2013.01); *G06T 1/60* (2013.01);
(Continued)

(58) Field of Classification Search
CPC .... G06F 21/30; G06F 21/445; G06F 21/6209; G06T 3/14; G06T 9/00
See application file for complete search history.

(56) References Cited

U.S. PATENT DOCUMENTS 10,764,752 B1 * 9/2020 Avetisov ................. G06F 21/45
2004/0193874 A1 * 9/2004 Kanazawa ............... G06F 21/10
713/161
(Continued)

FOREIGN PATENT DOCUMENTS

JP    2020-201716    12/2020

OTHER PUBLICATIONS

International Preliminary Report on Patentability issued Oct. 3, 2023 in International (PCT) Application No. PCT/JP2021/047588.
(Continued)

*Primary Examiner* — Nam T Tran
(74) *Attorney, Agent, or Firm* — Wenderoth, Lind & Ponack, L.L.P.

(57) ABSTRACT

A method is provided that determines authenticity of a second recording medium mounted in a second device by using a first device mounted with a first recording medium. A non-user area of the first recording medium previously records first identification information and first algorithm data. A controller of the first recording medium causes a first display device to display a first image pattern and, after display of the first image pattern, causes a first imaging device to capture a second image pattern displayed on a second display device of the second device. The controller decodes first code data from the second image pattern and utilizes the first algorithm data to perform arithmetic that uses the first identification information and a first variable value. The controller determines the second recording medium to be authentic if the decoded first code data matches an arithmetic result.

17 Claims, 11 Drawing Sheets

Related U.S. Application Data

(60) Provisional application No. 63/168,767, filed on Mar. 31, 2021.

(51) Int. Cl.
  *G06F 21/62* (2013.01)
  *G06T 1/60* (2006.01)
  *G06T 9/00* (2006.01)

(52) U.S. Cl.
  CPC ........ *G06T 9/00* (2013.01); *G06F 2221/2141* (2013.01)

(56) References Cited

U.S. PATENT DOCUMENTS

| | | | |
|---|---|---|---|
| 2007/0267474 A1* | 11/2007 | Shen | H04L 67/06 235/375 |
| 2009/0204806 A1* | 8/2009 | Kanemura | G06F 21/445 713/155 |
| 2017/0126408 A1* | 5/2017 | Van Someren | G06F 21/6209 |
| 2023/0336543 A1* | 10/2023 | Andersson | G06F 21/45 |
| 2023/0367865 A1* | 11/2023 | Ellis, Jr. | G06F 21/44 |

OTHER PUBLICATIONS

International Search Report issued Mar. 15, 2022 in International (PCT) Application No. PCT/2021/047588.

\* cited by examiner

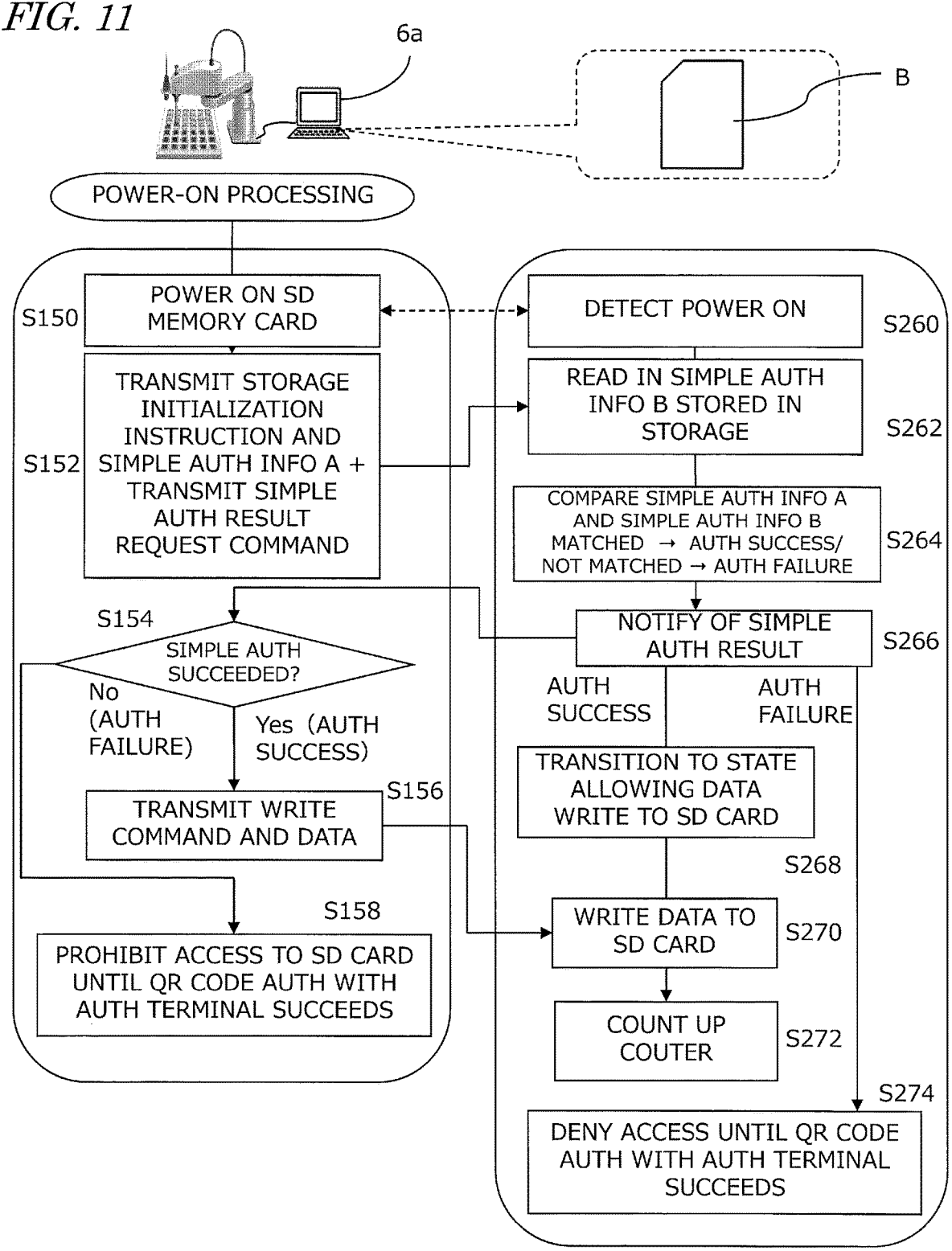

METHOD FOR DETERMINING AUTHENTICITY OF RECORDING MEDIUM AND RECORDING MEDIUM

CROSS REFERENCE TO RELATED APPLICATIONS

This is a continuation application of International Application No. PCT/JP2021/047588, with an international filing date of Dec. 22, 2021, which claims priority of U.S. provisional Application No. 63/168,767 filed on Mar. 31, 2021, each of the content of which is incorporated herein by reference.

TECHNICAL FIELD

The present disclosure relates to a method for determining authenticity of a recording medium, and to the recording medium.

RELATED ART

With the spread of the communications infrastructure related to wired communication and wireless communication, it is becoming commonplace to connect a multiplicity of devices to communications networks. Connecting to the communications networks enables the devices to easily acquire latest data or easily send data held by themselves to servers on the networks, etc., on the communications networks. Cybersecurity is usually ensured for such devices. The cybersecurity refers to the fact that measures necessary for information security management and measures necessary for ensuring safety and reliability of information systems and information communications networks are taken and that the conditions are maintained and managed. For example, Japanese Laid-open Patent Publication No. 2020-201716 A discloses a technique improving the security related to authentication for accessing devices by using an authentication server.

However, there still exists a risk that a malicious third party may unauthorizedly access devices via a communications network to steal information.

SUMMARY

Considering cybersecurity threads, the case is also fully conceivable where important equipment such as industrial equipment or infrastructure is used offline. At that time, the online authentication technique cannot be used that authenticates as an authorized user on the premise of communication.

An object of the present disclosure is to provide an offline authentication technique for verifying authenticity of an object even in the situation where it is not connected to a communications network.

A method of the present disclosure is a method that determines authenticity of a second recording medium mounted in a second device by using a first device mounted with a first recording medium. The first device has a first imaging device and a first display device, while the second device has a second imaging device and a second display device. The first recording medium and the second recording medium each have: a flash memory that has a user area in which a user is allowed to rewrite data, and a non-user area in which the user is not allowed to rewrite data; and a controller that controls data write to and/or data read from the flash memory. The non-user area of the first recording medium records in advance first identification information and first algorithm data defining an arithmetic method. The controller of the first recording medium causes the first display device to display a first image pattern representing a given first variable value encoded in one or two dimensions. Then, after display of the first image pattern, the controller causes the first imaging device to capture a one- or two-dimensional second image pattern displayed on the second display device of the second device. Furthermore, the controller decodes first code data from the captured second image pattern and utilizes the first algorithm data to perform arithmetic that uses the first identification information and the first variable value, to output first result data as an arithmetic result. The controller determines the second recording medium to be authentic if the decoded first code data matches the output first result data.

A recording medium of the present disclosure is the first recording medium and is a recording medium comprising a controller that executes the above determining method.

According to the present disclosure, there can be provided an offline authentication technique for verifying authenticity of an object even in the situation where it is not connected to a communications network.

BRIEF DESCRIPTION OF DRAWINGS

FIG. 11 is a flowchart showing a procedure of simple authentication processing upon power on.

DETAILED DESCRIPTION

An embodiment will now be described in detail with appropriate reference to the drawings. Note however that more detailed description than necessary may be omitted. For example, detailed description of already well-known matters or duplicate description for substantially the same configuration may be omitted. This is to avoid unnecessary redundancy in the following description and to facilitate the understanding of those skilled in the art.

The inventors provide the accompanying drawings and the following description to help those skilled in the art fully understand the present disclosure, but do not intend to limit the claimed subject matter.

[1. Configuration of Offline Authentication System]

Figure 1:
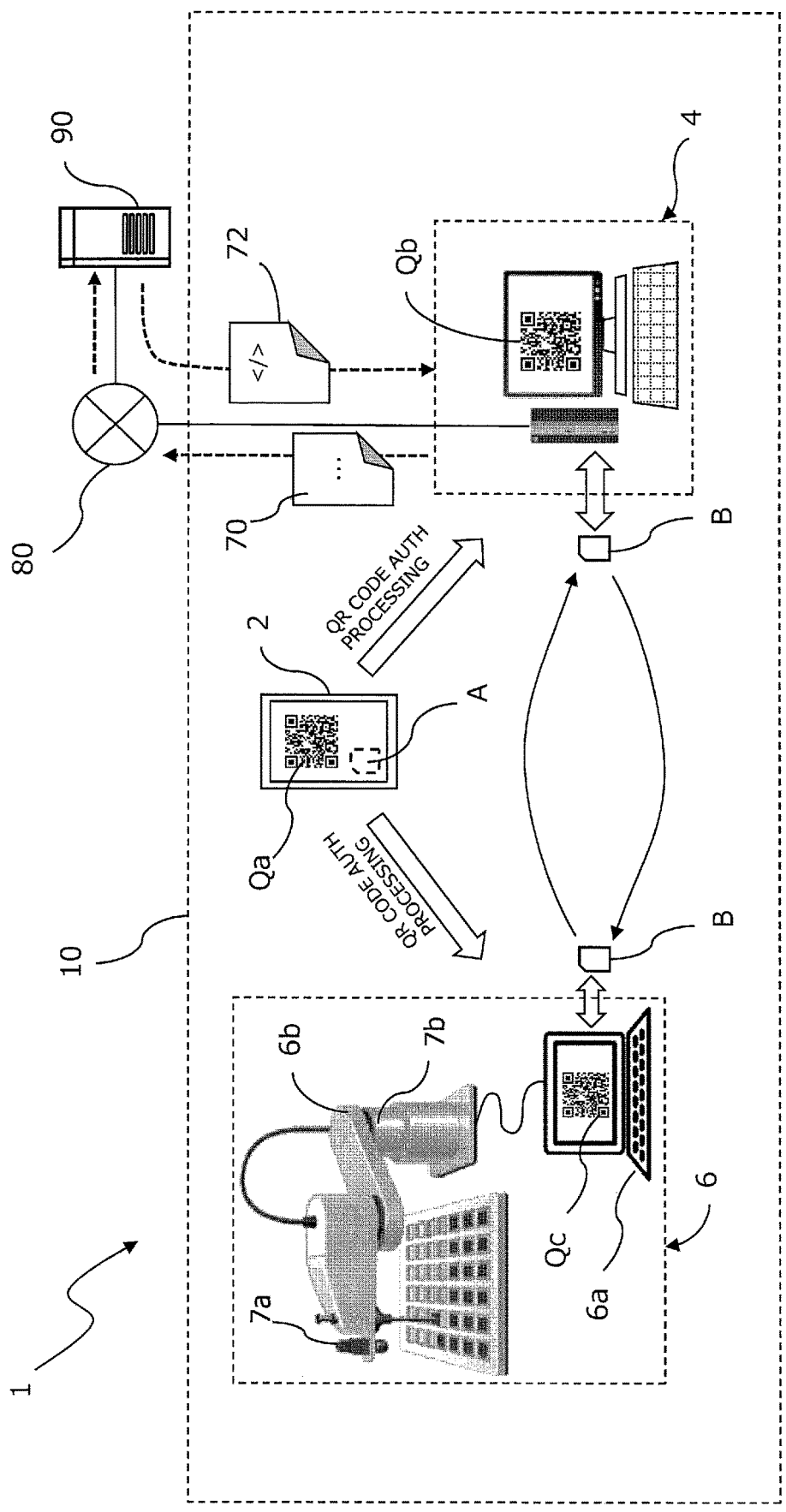
FIG. 1 is a block diagram showing a hardware configuration of an offline authentication system.

FIG. 1 is a block diagram showing a hardware configuration of an offline authentication system 1. The offline authentication system 1 is utilized to authenticate equipment that is usually utilized offline, such as factory equipment, industrial machinery, and infrastructural facilities, installed in a factory 10 for example. The reason for utilizing equipment offline is to prevent a malicious third party from intruding from outside to hack equipment or to steal equipment data. That is, the reason is to protect equipment from cybersecurity threats. Hereinafter, equipment usually utilized offline is referred to as "offline equipment".

Even if it is offline equipment, in maintenance/periodic check, it needs to perform, for example, collection of sensor data accumulated by the offline equipment or upgrading of an action program used in the offline equipment. In such a case, there arises a need for collecting sensor data from the offline equipment or introducing software from outside into the offline equipment. In such a case, a removable recording medium like an SD memory card can be utilized.

Because of equipment usually utilized offline to keep security high, the recording medium attached to such equipment needs also to be verified about whether it is a recording medium originally intended for utilization, i.e., about the legitimacy or authenticity of the recording medium. The offline authentication system 1 enables verification of the authenticity of the recording medium by imparting a mechanism for such authentication to the recording medium itself. Such a mechanism is specifically as follows.

A plurality of removable recording media expected to be utilized in the factory 10 is first prepared. All of such recording media include a flash memory having a "user area" in which the user can rewrite data, and a "non-user area" in which the user cannot rewrite data. In the non-user area there are recorded in advance same identification information and algorithm data defining an arithmetic method. In this embodiment, the identification information is referred to as "initial registration ID (IID)", and the algorithm data is referred to as "one-way function". Due to the need to record necessary information in advance in the non-user area, each recording medium is manufactured for the purpose that, for example, a certain business operator performs authentication of the present disclosure.

In the offline authentication system 1 according to this embodiment, an authentication terminal 2 mounted with an SD memory card A authenticates the authenticity of another SD memory card B by utilizing the initial registration ID and the one-way function recorded on the SD memory card A. As will be described later, in the case of utilizing the SD memory card, a controller, i.e., an arithmetic circuit included in the SD memory card performs necessary processing, to cause a display of the authentication terminal 2 or the like to display a QR code (registered trademark; hereinafter the same) for authentication. The "QR code" is a matrix two-dimensional code expressing data with a predetermined data length or less by an image pattern. Although an example using the QR code is described in this embodiment, using the QR code is not essential. For example, use may be made of a bar code that is a one-dimensional code.

Since information and features required for QR code generation are stored in the non-user area (secure area) of the card, there is little or no need to ensure security or to have special features on the equipment side. The equipment to be mounted with the SD memory card need only have features of displaying and reading a QR code based on instructions and data from the controller, with no need for other special equipment and/or features. That is, though the equipment is required for authentication, it can be substantially said that the SD memory card A authenticates the SD memory card B. This enables the manager of the factory 10 to introduce the offline authentication system 1 at a relatively low cost. The offline authentication system 1 will hereinafter be described specifically.

In the offline authentication system 1, the authentication terminal 2 mounted with the SD memory card A is utilized in the factory 10 for example, to verify the authenticity of the SD memory card B mounted in a management system 4 or a machine tool control system 6. The authentication terminal 2 can be a mobile computer, such as, e.g., a smartphone, a tablet PC, or a laptop PC. Utilized mainly at this time are the SD memory cards and the QR codes, which implement authentication (local authentication) offline and within the factory 10.

Assume that the SD memory card B is at first mounted in a control device 6a of the machine tool control system 6. The control device 6a is a computer system, e.g., a PC, that controls a machine tool 6b, and has an SD memory card slot (not shown) for receiving the SD memory card B. The machine tool 6b includes various sensors 7a and 7b. The sensor 7a is, for example, a camera having an image sensor, while the sensor 7b is an angle sensor that detects a rotation angle of a motor (not shown) of the machine tool 6b. The SD memory card B records therein sensor data of the various sensors 7a and 7b collected along with the action of the machine tool 6b.

Such SD memory card B is removed from the control device 6a; carried by a person; and mounted in a PC (hereinafter, described as "management PC 4") of the management system 4. Once the SD memory card B is removed from the control device 6a, it is unknown to the management PC 4 whether the SD memory card B is the SD memory card originally expected to be used, i.e., whether the SD memory card B is authentic. Thus, in this embodiment, the authenticity of the SD memory card B is verified by authentication processing that uses a QR code Qa displayed on the display of the authentication terminal 2. At this time, the SD memory card A of the authentication terminal 2 may additionally be authenticated using an QR code Qb displayed on a display of the management PC 4. This renders it possible to perform stricter authentication. A detailed procedure of the authentication processing will be described later.

As a result of verifying the authenticity of the SD memory card B, the SD memory card A outputs a command notifying permission of access to the SD memory card B, via the authentication terminal 2, to the SD memory card B of the management PC 4. In response to reception of the command, the controller of the SD memory card B permits data read from and/or data write to the flash memory within the SD memory card B.

The management PC 4 is connected to a communications network 80 so that it can communicate with a cloud server 90. Since access to the flash memory within the SD memory card B has been permitted through verification of the authenticity of the SD memory card B, the management PC 4 reads out sensor data 70 recorded on the SD memory card B, to transmit it via the communications network 80 to the cloud server 90. The cloud server 90 analyzes the sensor data 70 to thereby generate an action program 72 that is more adapted to the machine tool control system 6. The cloud server 90 transmits the action program 72 via the communications network 80 to the management PC 4. Since access to the SD memory card B has been permitted in the management PC 4, the action program 72 is recorded on the SD memory card B. Afterward, the SD memory card B is removed from the management PC 4 and again mounted in the control device 6a of the machine tool control system 6. This time also, authentication processing using a QR code Qc is performed between the authentication terminal 2 and the control device 6a, to verify the authenticity of the SD memory card B. When the authenticity of the SD memory card B is verified, the control device 6a can read the action program 72 to upgrade the existing action program.

Prior to describing the authentication processing using the QR code, description will be given of configurations of the equipment and the SD memory cards that are utilized for authentication processing.

Figure 2:
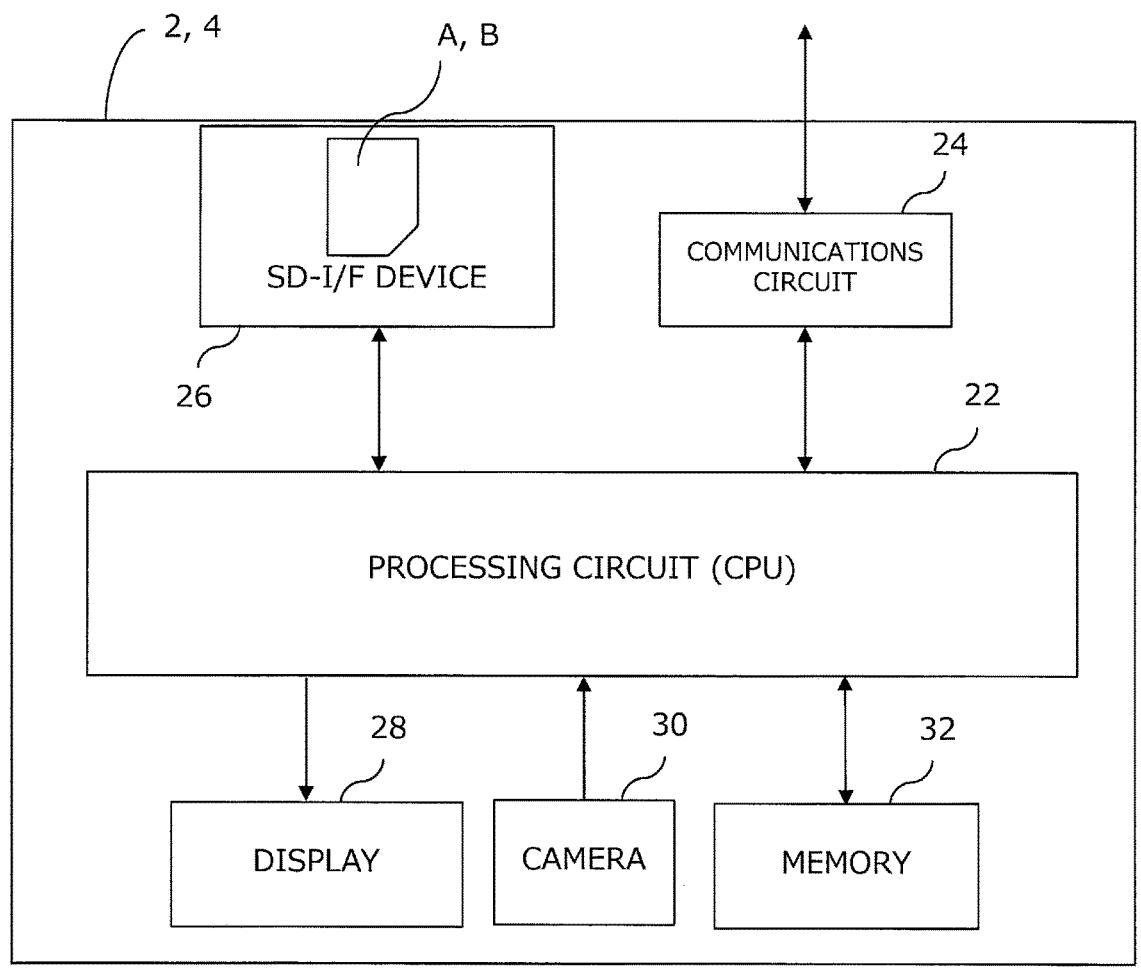
FIG. 2 is a hardware configuration diagram of an authentication terminal and a management PC.
Figure 3:
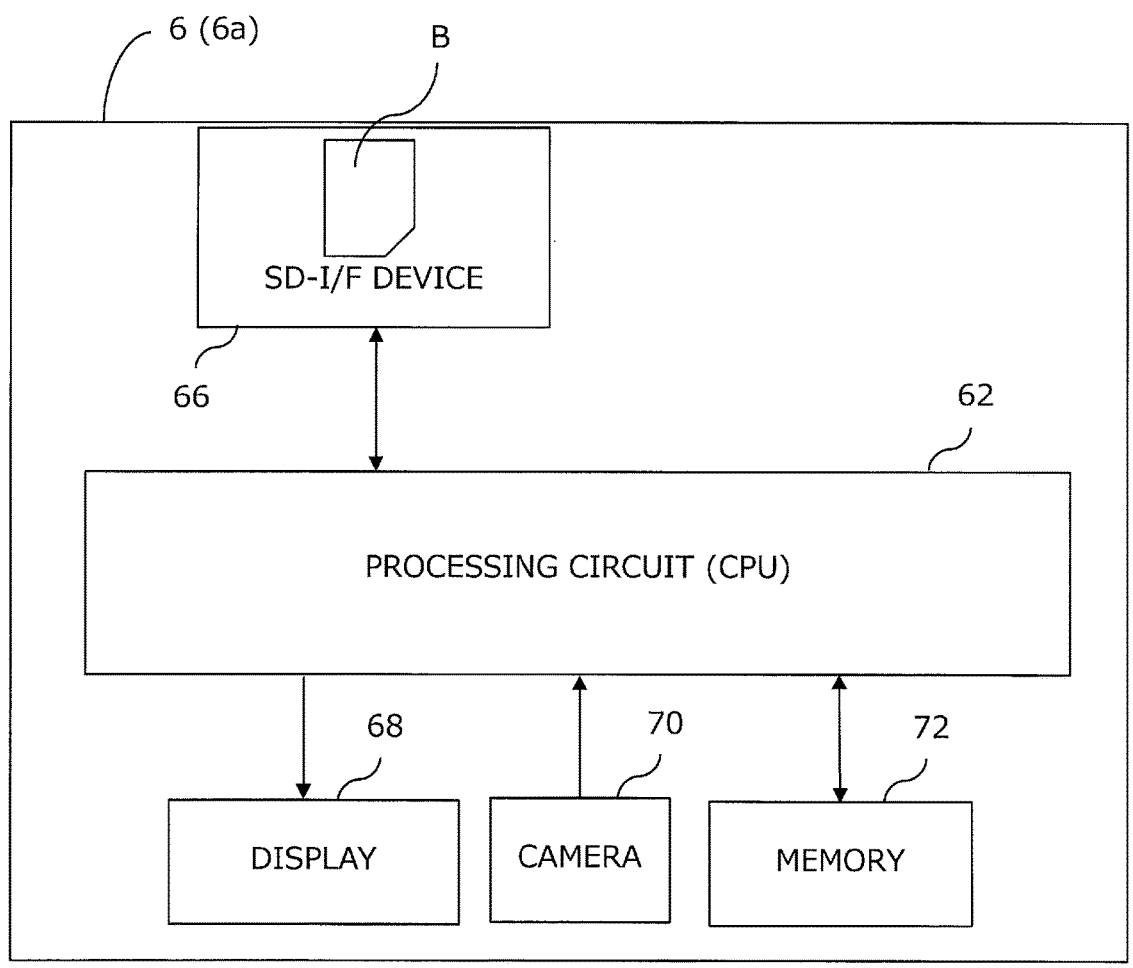
FIG. 3 is a hardware configuration diagram of a control device.

FIG. 2 shows a hardware configuration common between the authentication terminal 2 and the management PC 4. FIG. 3 shows a hardware configuration of the control device 6a. Difference between FIG. 2 and FIG. 3 lies in that a communications circuit present in the configuration of FIG. 2 is absent in the control device 6a of FIG. 3. The other configurations are the same. Hereinafter, reference is made to FIG. 2.

The authentication terminal 2 and the management PC 4 have a processing circuit 22, a communications circuit 24, an SD memory card interface device (SD-I/F device) 26, a display 28, a camera 30, and a memory 32. Hereinafter, the SD-I/F device will be abbreviated as "I/F device".

The processing circuit 22 is a semiconductor integrated circuit called a so-called CPU (Central Processing Unit). The processing circuit 22 issues a command via the I/F device 26 to the SD memory card A or B and receives data from the SD memory card A or B. The processing circuit 22 is communicable also with other constituent elements. Although in the diagrams the processing circuit 22 is depicted as if connected directly to the constituent elements, it may be connected thereto, e.g., via an internal bus.

The communications circuit 24 interchanges information through wired or wireless communication with the outside. An example of the wired communication includes wired LAN based on the Ethernet (registered trademark) standard, or connection using an optical fiber cable. An example of the wireless communication includes wireless connection with external equipment via a base station, etc., or direct wireless connection with external equipment. An example of the wireless communication with external equipment via a base station, etc., includes: wireless LAN compliant with IEEE 802.11 that communicates wirelessly with a Wi-Fi (registered trademark) router; $3^{rd}$ generation mobile communications system (commonly called 3G); $4^{th}$ generation mobile communications system (commonly called 4G); $5^{th}$ generation mobile communications system (commonly called 5G); WiMax (registered trademark) compliant with IEEE 802.16, or LPWA (Low Power Wide Area).

The I/F device 26 includes an SD memory card slot into which the SD memory card A or B is fitted, a connection terminal within the interior of the slot, and various circuits that communicate with the SD memory card A or B. The detail of the configuration of the I/F device 26 will be described later with reference to FIG. 4.

The display 28 is a display device that displays letters, images, etc. In this embodiment, the display 28 is utilized to display a QR code.

The camera 30 is a well-known imaging device capable of capturing moving images or still images. In this embodiment, the camera 30 is utilized to shoot a QR code displayed on a display of the counterpart device.

The memory 32 stores a computer program the processing circuit 22 runs. In this specification, the memory 32 encompasses a RAM and a ROM. The computer program stored in the ROM is read by the processing circuit 22 to be developed into the RAM. This allows the processing circuit 22 to run the computer program.

Reference is then made to FIG. 3. The control device 6a has a processing circuit 62, an SD memory card interface device (SD-I/F device) 66, a display 68, a camera 70, and a memory 72. Hereinafter also, the SD-I/F device will be abbreviated as "I/F device". The substantial configurations thereof are the same as those of the constituent elements with the same names shown in FIG. 2. Accordingly, description of the constituent element with the same name in FIG. 2 is utilized as description of each constituent element, of which specific description will be omitted.

Figure 4:
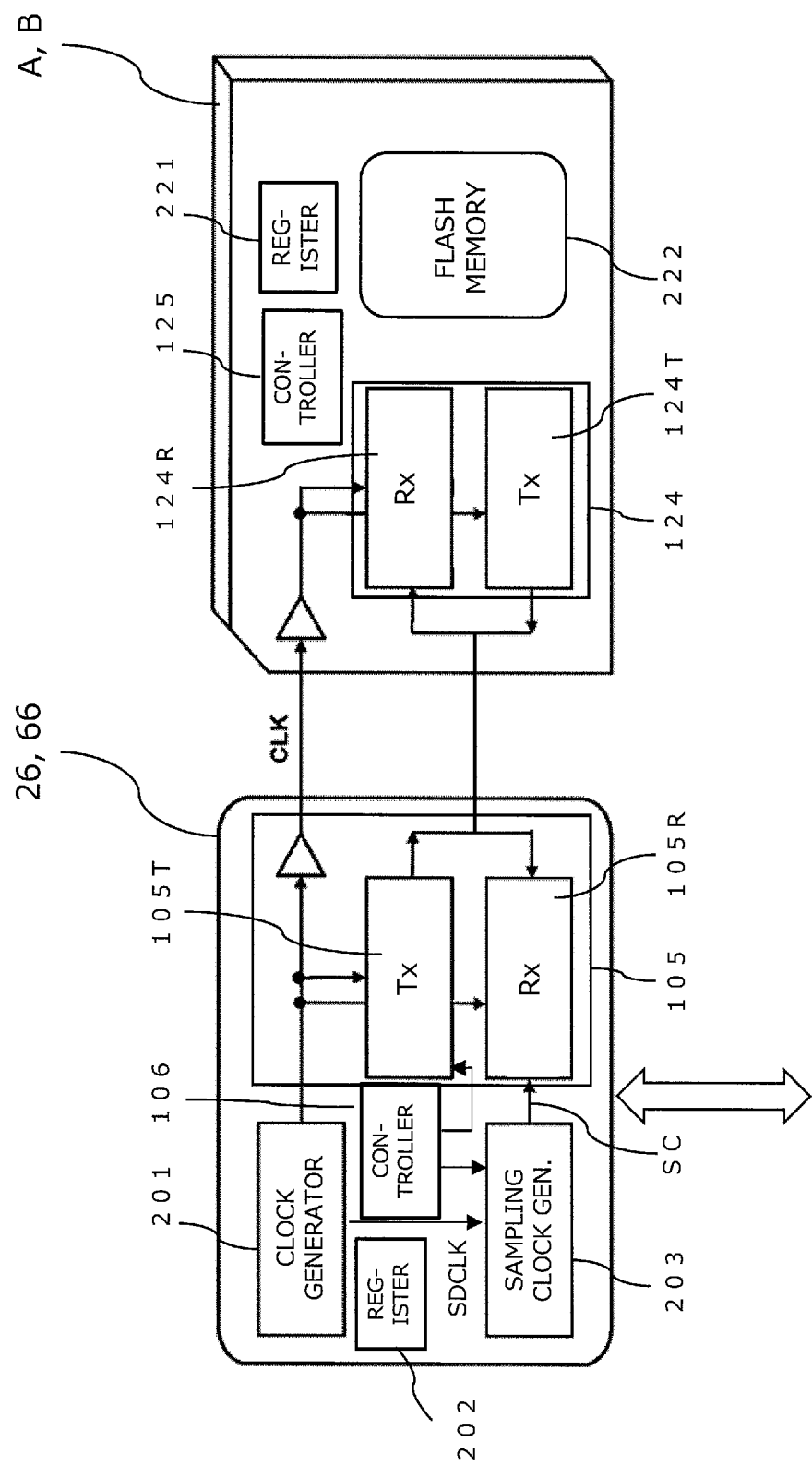
FIG. 4 is a detailed configuration diagram of an I/F device and an SD memory card.

FIG. 4 shows detailed configurations of the I/F devices 26 and 66, and the SD memory cards A and B. Generally, the I/F devices 26 and 66 are called "host devices", while the SD memory cards A and B are called also "slave devices". Hereinafter, the I/F device 26 and the SD memory card A are exemplified for description.

The I/F device 26 has a controller 106, a host device I/F 105, a clock generator 201, a register 202, and a sampling clock generator 203. The host device I/F 105 has a transmitting unit 105T implementing a transmission feature, and a receiving unit 105R implementing a reception feature.

The SD memory card A has a slave device I/F 124, a controller 125, a register 221, and a flash memory 222. The slave device I/F 124 has also a transmitting unit 124T implementing the transmission feature, and a receiving unit 124R implementing the reception feature.

The clock generator 201 of the I/F device 26 outputs a basic clock signal tclk onto a CLK line 111. For example, one period of the basic clock signal tclk is 2.8 ns and the frequency is 208 MHz. The basic clock signal is transmitted via the host device I/F 105 to the SD memory card A and is utilized as a clock signal when the SD memory card A operates. The clock generator 201 outputs the basic clock signal to the sampling clock generator 203 as well. In FIG. 4, the basic clock signal received by the sampling clock generator 203 is depicted as "SDCLK" for convenience.

The sampling clock generator 203 receives the basic clock signal SDCLK from the clock generator 201 and receives a selection signal from the controller 106, to output a sampling clock signal. The sampling clock signal is a clock signal that is utilized when deciding a so-called punching timing.

Although the data transmission/reception between a host device and a slave device is performed using the transmitting unit 105T and the receiving unit 105R of the host device I/F 105 and the transmitting unit 124T and the receiving unit 124R of the slave device I/F 124, it will not be explicitly stated below. Description will be given simply assuming that communication is made between the controller 106 of the I/F device 26 and the controller 125 of the SD memory card A.

Figure 5:
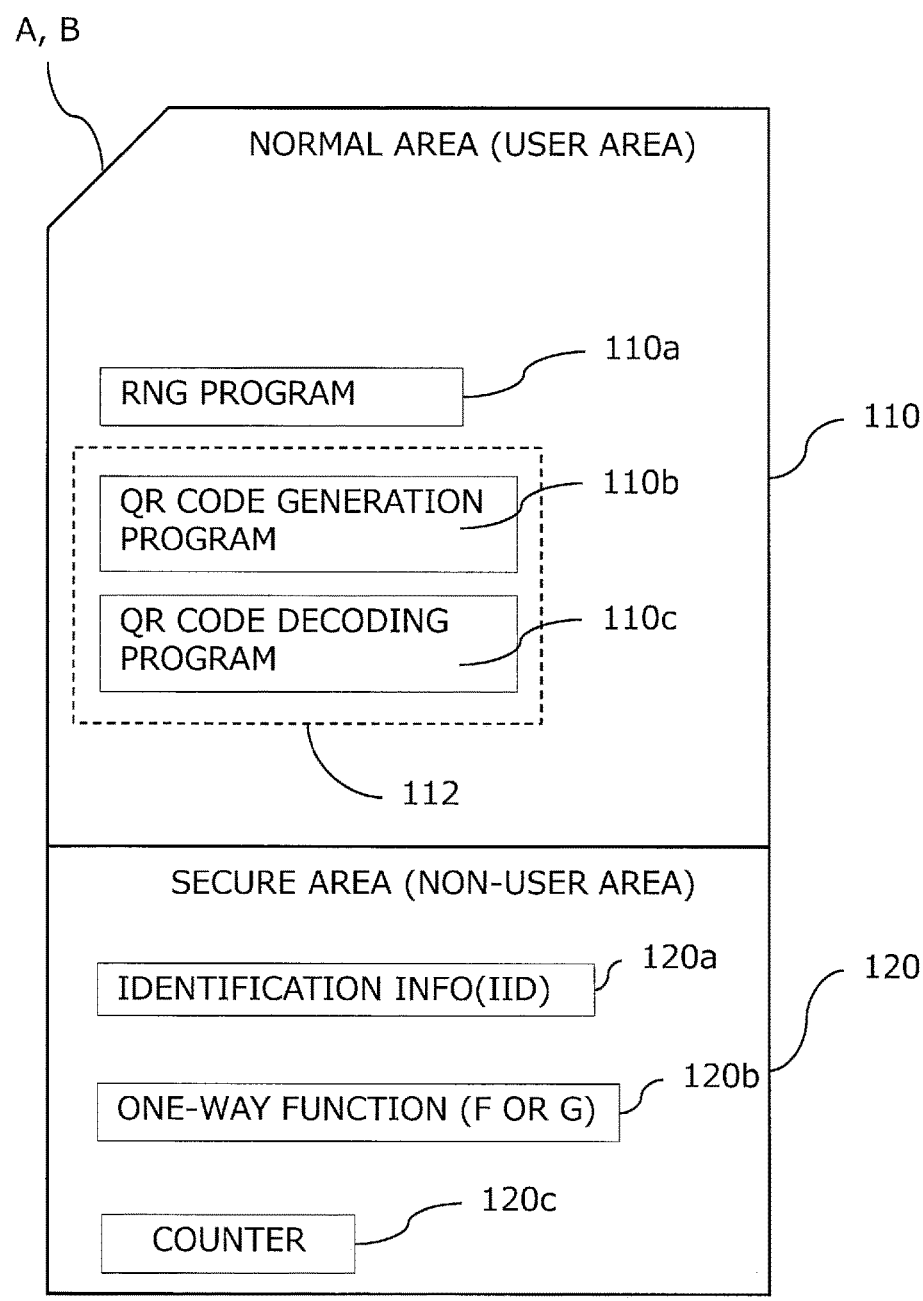
FIG. 5 is a configuration diagram of a recording area of the SD memory card.

Referring next to FIG. 5, description will be given of a recording area of the SD memory cards A and B that is configured by the register 221 and the flash memory 222.

FIG. 5 is a diagram for explaining a configuration of the recording area of the SD memory cards A and B. The recording area of the SD memory cards A and B has a normal area or a user area 110 and a secure area or a non-user area 120.

The user area 110 is an area in which the user can rewrite data. The user area 110 records in advance a random number generation program 110a, a QR code generation program 110b, and a QR code decoding program 110c. The random number generation program 110a is a program that generates a random number using a well-known algorithm. The random number is an example of a predetermined variable value. The QR code generation program 110b is a program that generates, from predetermined data, a QR code representative of the data. The QR code decoding program 110c is a program that decodes a QR code captured by the camera 30 or 70, to extract data. These programs are run by the controller 125 of the SD memory cards A and B. The generation method and the decoding method of the QR code are well known. Hence, description will be omitted of the concrete processing contents of the QR code generation program 110b and the QR code decoding program 110c. The QR code generation program 110b and the QR code decoding program 110c need not be separate programs, and a single program may perform both the generation and decoding of the QR code. The random number generation program 110a, the QR code generation program 110b, and the QR code decoding program 110c may be recorded in the non-user area 120.

The non-user area 120 is an area in which the user cannot rewrite data. The non-user area 120 records in advance identification information (IID) 120a and a one-way function 120b. The identification information (IID) 120a is information common, in other words, identical between the SD memory cards A and B. The one-way function 120b specifies an arithmetic method for computing an output value from an input value. In this embodiment, an example of the one-way function 120b is SHA-256 that is a cryptographic hash function. SHA-256 is a hash function that generates a hash value (output value) having a 256-bit hash length from an input value having a 32-bit word length.

FIG. 5 depicts a "counter 120c" as well. The counter 120c is utilized in a simple authentication mode that will be described later. In the case of not utilizing the simple authentication mode, disposing the counter 120c is not essential.

In the following description, for convenience, assume that the SD memory card A records a "one-way function F" and that the SD memory card B records a "one-way function G". This is because, although the one-way functions F and G need to be identical for the authentication to be established, it is impossible to assume that the both are the same when explaining the process of authentication processing.

[2. Action Performed in Offline Authentication System 1]

An authentication processing procedure in the offline authentication system 1 will then be described. As briefly described above with reference to FIG. 1, exemplary description will hereinafter be given of a process performed when updating an action program of the machine tool control system 6 by utilizing the SD memory card B.

Figure 6:
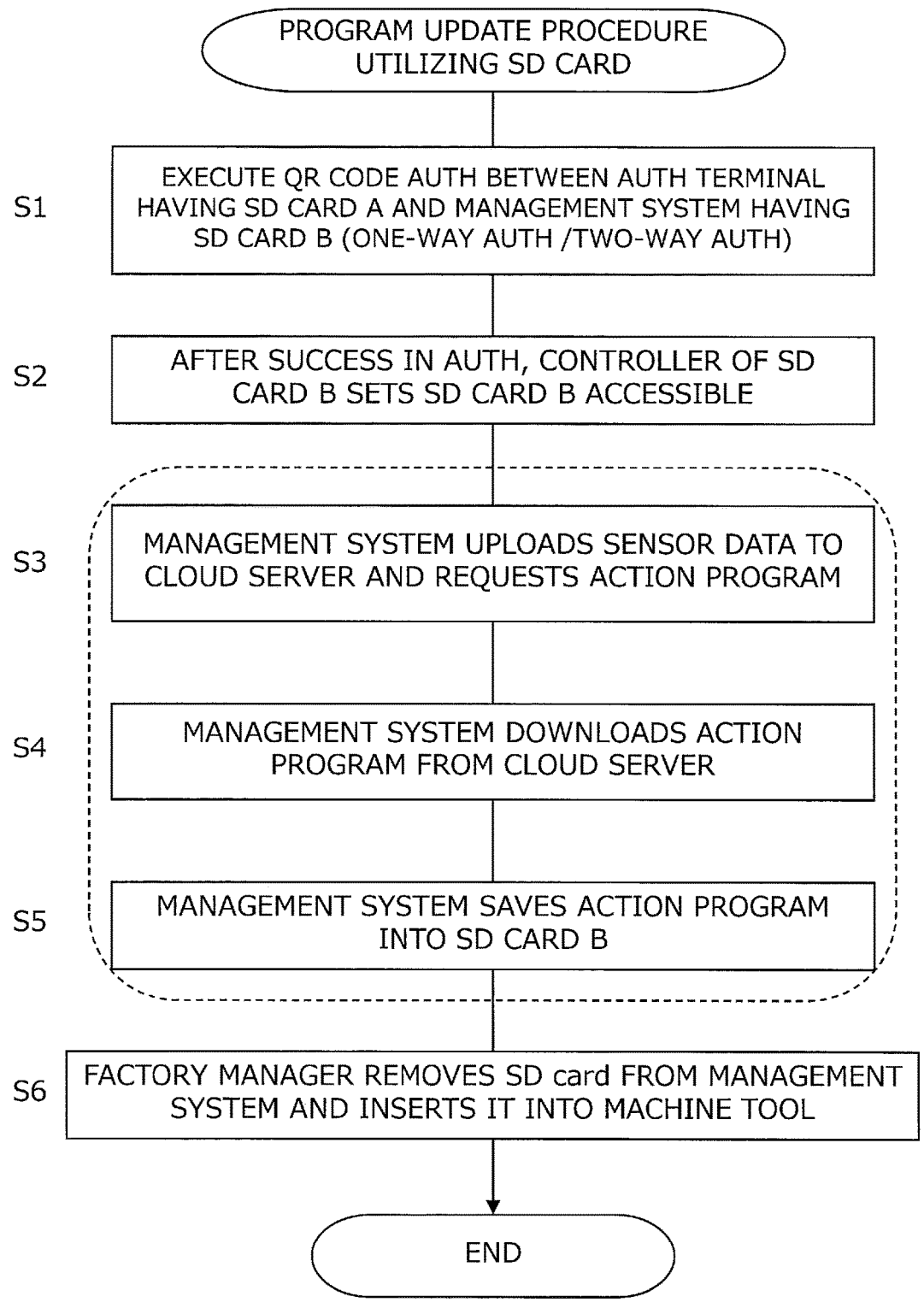
FIG. 6 is a diagram showing a procedure for updating a machine tool control program using the SD memory card.

FIG. 6 is a diagram showing a procedure for updating a machine tool control program using the SD memory card B. It is to be noted that, though FIG. 6 is formally a flowchart, it shows an action procedure performed in the entire offline authentication system 1 but does not show processing executed by a specific CPU, etc. For the convenience of depiction, the "SD memory card" is abbreviated as "SD card" on the diagram.

At step S1, a QR code authentication is executed between the authentication terminal 2 having the SD memory card A and the management PC 4 having the SD memory card B. The QR code authentication is carried out by either one-way authentication or two-way authentication.

At step S2, if authentication succeeds, then the controller 125 of the SD memory card B sets the SD memory card B accessible. "Access" encompasses data read and data write. In the case where the SD memory card B has no restriction on data read, only write-permitted may be set.

At step S3, the management PC 4 uploads sensor data to the cloud server 90 and concurrently requests an action program.

The management PC 4 at step S4 downloads the action program from the cloud server 90 and at step S5 saves the action program into the SD memory card B.

At step S6, the manager of the factory 10 removes the SD card B from the management system and inserts it into the machine tool control system 6. Subsequently, the above one-way authentication or the two-way authentication is performed between the authentication terminal 2 and the machine tool control system 6 as the authentication processing for verifying the authenticity of the SD memory card B, and when the authenticity is verified, the machine tool control system 6 is allowed to read out and run the updated action program. It is possible, by e.g., utilizing a so-called artificial intelligence, to tune up the action program based on sensor data proper to the machine tool 6b to thereby generate an updated program.

Concrete contents of the authentication processing will next be described.

Figure 7:
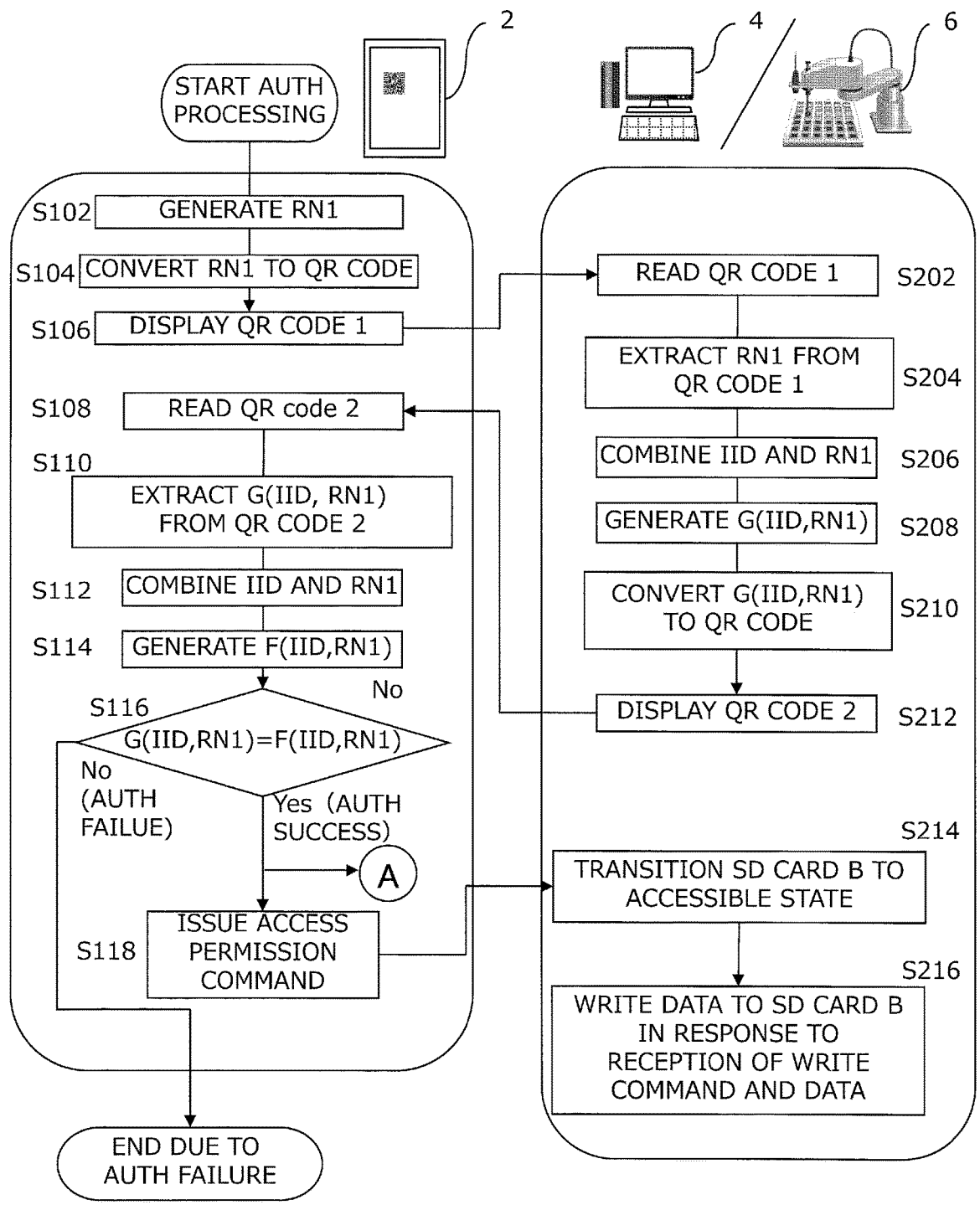
FIG. 7 is a flowchart showing an authentication processing procedure.
Figure 8:
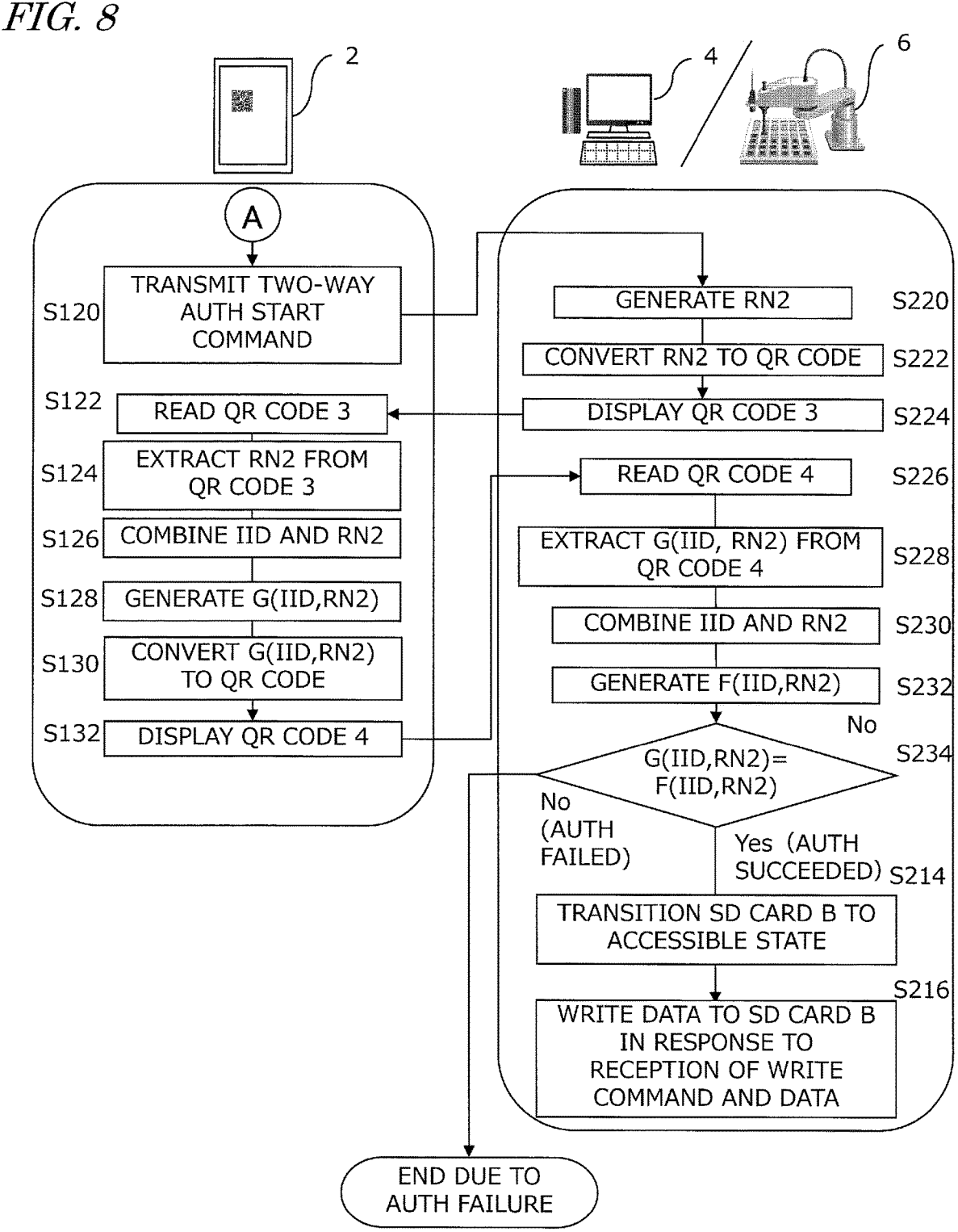
FIG. 8 is a flowchart showing a two-way authentication processing procedure.

FIG. 7 is a flowchart showing an authentication processing procedure. FIG. 7 shows, on the left side, a processing procedure of the controller 125 of the SD memory card A mounted in the authentication terminal 2 in principle, and, on the right side, a processing procedure of the controller 125 of the SD memory card B mounted in the management PC 4 or the machine tool control system 6 in principle. Here, a part of processing on the left side of FIG. 7 may be processed by the CPU 22 of the management PC 4 or the CPU 62 of the machine tool control system 6, while a part of processing on the right side may be processed by the CPU 22 of the authentication terminal 2. Note that FIG. 7 shows a processing procedure of the "one-way authentication" in which the controller 125 of the SD memory card A verifies the authenticity of the SD memory card B mounted in the management PC 4 or the machine tool control system 6. A processing procedure of the "two-way authentication", where the controller 125 of the SD memory card B additionally verifies the authenticity of the SD memory card A after the processing of the "one-way authentication", is shown in FIG. 8 and will be described later.

Hereinafter, description will be given of processing in which the authenticity of the SD memory card B is verified using the authentication terminal 2 and the management PC 4.

At step S102 of FIG. 7, the controller 125 of the SD memory card A runs the random number generation program 110a to generate a random number RN1. Then, at step S104, the controller 125 runs the QR code generation program 110b to convert the random number RN1 to a QR code. At step S106, the controller 125 transmits image pattern data of the QR code to the authentication terminal 2, causing the display 28 of the authentication terminal 2 to display the QR code. Hereinafter, the QR code displayed on the display 28 of the authentication terminal 2 is referred to as "QR code 1".

With the QR code 1 appearing on the display 28, the user of the authentication terminal 2 directs the display 28 having the QR code 1 displayed thereon toward the management PC 4 so that the display 28 comes into the field of view of the camera 30 disposed in the management PC 4. Subsequent processing is started by the controller 125 of the SD memory card B mounted in the management PC 4.

At step S202, the controller 125 of the SD memory card B acquires a result of reading the QR code 1 by the camera 30, into the management PC 4. At step S204, the controller 125 decodes the QR code 1 using the QR code decoding program 110c, to extract code data. The code data represents the random number RN1 generated by the controller 125 of the SD memory card A.

The controller 125 combines the identification information (IID) stored in the non-user area 120 and the extracted RN1 at step S206, and assigns it to the one-way function G to generate a value G (HD, RN1) at step S208. Afterward, the controller 125 converts the value G (HD, RN1) to a QR code using the QR code generation program 110b at step S210, and transmits image pattern data of the QR code (hereinafter, "QR code 2"). The management PC 4 causes the display 28 to display the QR code 2 at step S212.

Next, processing of the controller 125 of the SD memory card A mounted in the authentication terminal 2 is again started. In terms of the authentication terminal 2, it waits for processing until the QR code 2 is newly displayed on the display 28 of the management PC 4 after display of the QR code 1 on the display 28.

At step S108, the controller 125 of the SD memory card A acquires a result of reading the QR code 2 by the camera 30, into the authentication terminal 2. At step S110, the controller 125 decodes the QR code 2, to extract code data. The code data represents the G value (IID, RN1).

On the other hand, at step S112, the controller 125 combines the identification information (IID) stored in the non-user area 120 with the random number RN1 generated at step S102, and assigns it to the one-way function F to generate a value F (IID, RN1) at step S114.

At step S116, the controller 125 determines whether G=(IID, RN1)=F(IID, RN1) or not. Unless G=(IID, RN1)=F(IID, RN1) is established, the controller 125 of the SD memory card A determines that authentication has failed, to end the processing. Because of using the one-way function in this embodiment, the equation of step S116 is not established if the identification information IID and the random number value RN1 differ on the management PC 4 side or if the one-way function G differs from the one-way function F. As a result, the controller 125 of the SD memory card A can determine that the authenticity of the SD memory card B cannot be verified.

On the other hand, if the equation of step S116 is established, the controller 125 determines that authentication has succeeded. Afterward, processing proceeds to step S118. A process "A" shown in FIG. 7 is processing for the two-way authentication that will be described later.

At step S118, the controller 125 issues an access permission command, for transmission to the management PC 4.

In response to reception of the access permission command, the controller 125 of the SD memory card B at step S214 causes the SD card B to transition to the state accessible to the flash memory 222 of the SD card. This allows the controller 125 of the SD memory card B to write data received from the authentication terminal 2, the server 90, etc., into the flash memory 222 (step S216). As described above, the "access" may include not only write but also read.

By virtue of the above processing, the authenticity of the SD memory card B can be verified even when offline Since access to the SD memory card B is permitted only when the SD memory card B has been authenticated as an authorized recording medium, it can be prevented that data recorded on the SD memory card B is stolen or that data is unauthorizedly written to the SD memory card B by a malicious third party.

FIG. 8 is a flowchart showing a two-way authentication processing procedure. The procedure of FIG. 8 continues from "A" in the processing of the authentication terminal 2 of FIG. 7. Left and right descriptions of the processing procedure conform to FIG. 7.

Processing shown in FIG. 8 for two-way authentication is equivalent to processing where the controller 125 of the SD memory card A and the controller 125 of the SD memory card B in the one-way authentication of FIG. 7 are interchanged.

At step S120, the controller 125 of the SD memory card A mounted in the authentication terminal 2 issues a command instructing to start the two-way authentication, for transmission to the management PC 4.

At step S220, in response to reception of the command, the controller 125 of the SD memory card B generates a random number RN2 by the random number generation program 110a. Then at step S222, the controller 125 runs the QR code generation program 110b to convert the random number RN1 to a QR code. At step S224, the controller 125 transmits image pattern data of the QR code to the management PC 4, to cause the display 28 of the management PC 4 to display a QR code ("QR code 3").

Processes from steps S122 to S132 executed by the controller 125 of the SD memory card A after displaying the QR code 3 on the display 28 of the management PC 4 are respectively similar to the processes from steps S202 to S212 of FIG. 7. Processes from steps S226 to S234 of the controller 125 of the SD memory card B in the management PC 4 after displaying the QR code 4 on the display 28 of the authentication terminal 2 at step S132 are respectively similar to the processes from steps S108 to S116 of FIG. 7. Description of these processes will therefore be omitted. Steps S214 and S216 are common between FIGS. 7 and 8. Note however that in the case of step S214 of FIG. 8, the controller 125 of the SD memory card A issues no access permission command, and the controller 125 of the SD memory card B allows transition to the accessible state by itself.

Execution of the two-way authentication enables verification of not only the authenticity of the SD memory card B but also of the authenticity of the SD memory card A. Since the SD memory card B does not transition to the accessible state unless the authenticity of the both is verified, a higher security can be ensured. For example, even in the case where the access permission command is erroneously issued to any SD memory card due to unauthorized theft/tampering of information within the SD card A, the SD memory card B can be prevented from being granted access permission.

Processing for simplifying the authentication procedure will then be described. In the case where an SD memory card is newly mounted in the management PC 4 or in the case where an SD memory card has already been mounted upon power-on of the management PC 4 or the machine tool control system 6, equipment cannot access unlimitedly to the SD memory card. If the authenticity of the SD memory card has been verified by the authentication processing shown in FIG. 7 using the authentication terminal 2, the controller of the SD memory card of the authentication terminal 2 permits access to the SD memory card. Alternatively, only when the authenticity of the SD memory card has been verified by the authentication processing shown in FIG. 8 using the authentication terminal 2, the controller of the SD memory card mounted in the management PC 4, etc., sets permission of access to itself.

The following description will be given assuming the situation where the SD memory card B is mounted in the machine tool control system 6, with the control device 6a reading an action program within the SD memory card B to control the machine tool 6b. When the work of the machine tool 6*b* terminates, the power source of the machine tool control system 6 is turned off, and when the next work starts, the power source is turned on. Normally, after power on, the authenticity of the SD memory card B mounted in the machine tool control system 6 is authenticated using the authentication terminal 2. Only after verification of the authenticity, the control device 6*a* can control the machine tool 6*b* by utilizing the action program.

Instead of performing such authentication processing every time, the authenticity of the SD memory card was deemed to be ensured if certain conditions are fulfilled, whereby permission of access to the SD memory card can be set without going through the authentication processing using the authentication terminal 2. Introduction of such simple authentication is especially useful since individual authentication processing need not be done in the case where e.g., a multiplicity of machine tool control systems 6 exist in the factory 10. The simple authentication processing is not essential processing in the present disclosure and is processing that the user can arbitrarily select whether to adopt or not.

Figure 9:
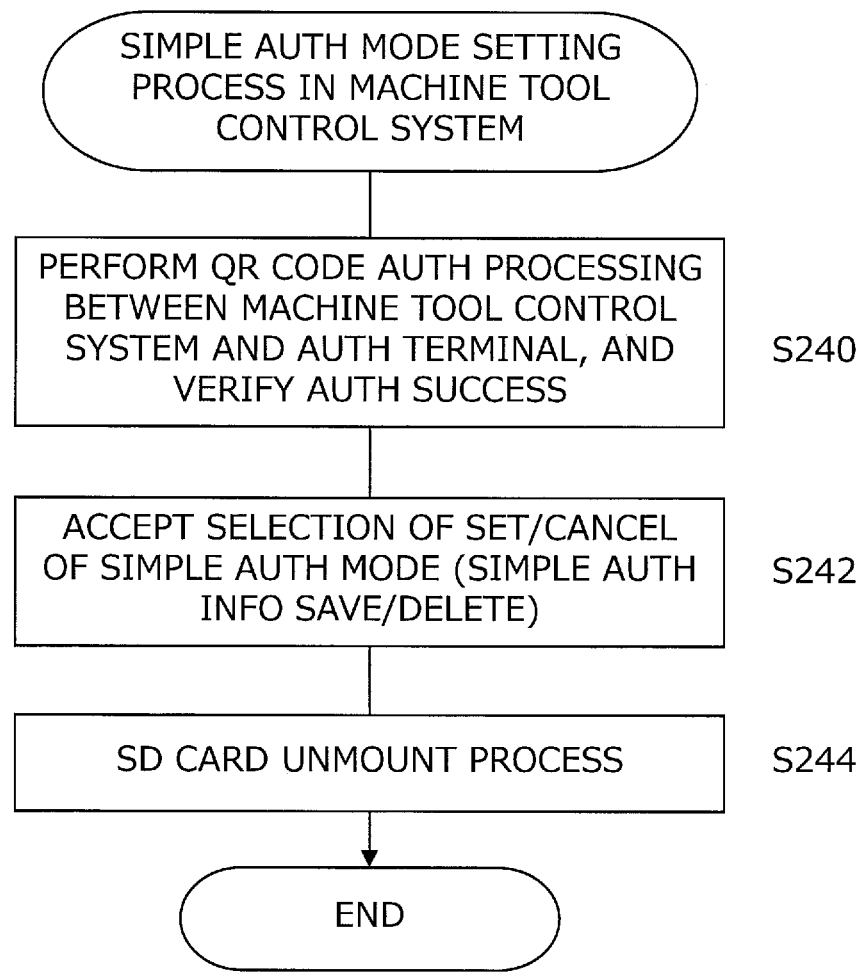
FIG. 9 is a flowchart showing a procedure of simple authentication mode setting processing in a machine tool control system.

FIG. 9 is a flowchart showing a procedure of simple authentication mode setting processing in the machine tool control system. It is not set from the beginning to utilize the simple authentication mode. Thus, the setting is required as a declaration of intention to use the simple authentication mode.

At step S240, the controller 125 of the SD memory card B mounted in the control device 6*a* of the machine tool control system 6 performs QR code authentication processing between the controller 125 and the authentication terminal 2, to verify success in authentication.

At step S242, setting of set/cancel of the simple authentication mode is accepted based on the user's operation input. This allows simple authentication information to be saved at the time of an unmount process of step S244.

In this embodiment, the "simple authentication information" is information represented as the sum of a random number generated at a point of time when e.g., the simple authentication information is generated, and a counter value of the counter 120*c* (FIG. 5) of the SD memory card at the point of time. In place of the sum, the simple authentication information may be generated by various arithmetic methods such as difference, product, and exclusive OR, or only the counter value may be used. At least the counter value need only be included. The counter 120*c* (FIG. 5) is managed in the non-user area 120 of the SD memory card, and its counter value increases when write to the SD memory card occurs. This counter value is only counted up, but prohibits counting down, clearing, or external user's any rewriting. The counting up is an example and only the counting down may be performed. In short, a counter allowing one way counting needs only to be disposed.

In the case where the simple authentication mode has already been set, when cancel of the simple authentication mode is selected, the simple authentication information is deleted and is not saved until the simple authentication mode is next set.

Figure 10:
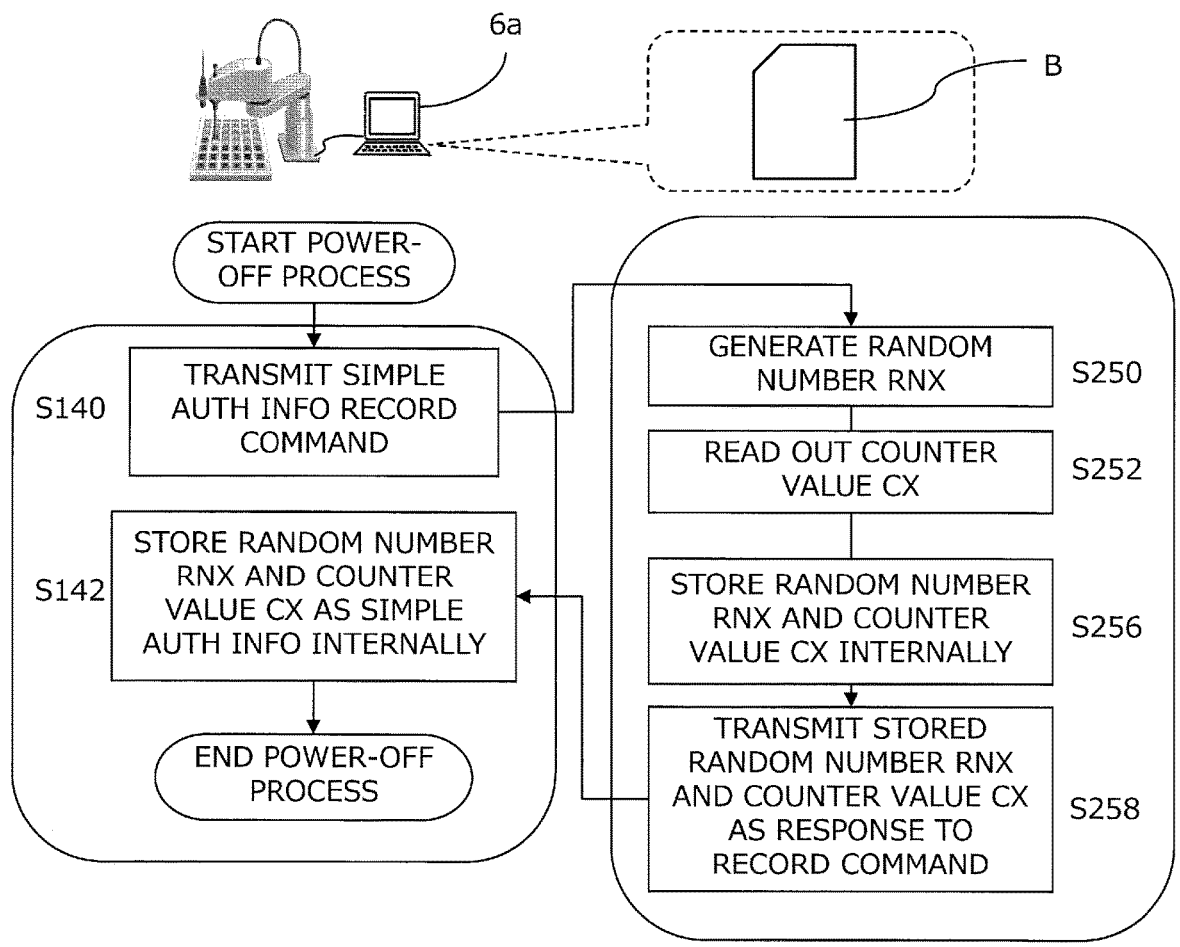
FIG. 10 is a flowchart showing a procedure of processing of generating simple authentication data upon power off.

At step S244, the unmount process of the SD memory card B is performed at a timing when e.g., the machine tool control system 6 is powered off. The "unmount process" is a process to cancel recognition of the SD memory card B mounted and recognized in the control device 6*a*, and is performed in order to prevent damage of data within the SD memory card. At the point of time of the unmount process, the simple authentication information is recorded. Once unmounted, the control device 6*a* does not write data to the SD memory card B until again mounted. Referring to FIG. 10, processing upon power off will be described.

FIG. 10 is a flowchart showing a procedure of processing of generating simple authentication data upon power off. The processing of FIG. 10 is an example assuming the execution between the control device 6*a* of the machine tool control system 6 and the SD memory card B mounted in the control device 6*a*. Left side depicts action of the processing circuit 62 of the control device 6*a*, while right side depicts action of the controller 125 of the SD memory card B.

When power-off operation is performed by the user, at step S140, the processing circuit 62 of the control device 6*a* issues a simple authentication information record command, for transmission to the SD memory card B. The simple authentication information record command is a command requesting the SD memory card B to generate and record simple authentication information. As will be described below, as a response to this command, the SD memory card B transmits the generated simple authentication information to the control device 6*a*.

At step S250, the controller 125 of the SD memory card B generates a random number RNX using the random number generation program 110*a*. At step S252, the controller 125 reads out a counter value CX of the counter 120*c* from the non-user area 120. Then at step S256, the controller 125 saves the generated random number RNX and the counter value CX into the non-user area 120. At step S258, as a response to the record command, the controller 125 transmits the stored random number RNX and counter value CX to the control device 6*a*.

At step S142, the processing circuit 62 of the control device 6*a* saves the received random number RNX and counter value CX, as the simple authentication information, into e.g., the memory 72.

According to the above processing, at the point of time when the simple authentication information has been generated, the simple authentication information saved in the SD memory card B coincides with the simple authentication information saved in the memory 72 of the control device 6*a*.

FIG. 11 is a flowchart showing a procedure of simple authentication processing upon power on. The processing of FIG. 11 is also an example assuming the execution between the control device 6*a* of the machine tool control system 6 and the SD memory card B mounted in the control device 6*a*.

When power-on operation is performed by the user, at step S150, the processing circuit 62 energizes the SD memory card B to power the SD memory card B on. When the SD memory card B is energized, at step S260, a power-on detecting unit (not shown) disposed in the SD memory card B detects power on.

At step S152, the processing circuit 62 transmits a storage initialization instruction to the SD memory card B. In addition, the processing circuit 62 transmits simple authentication information A held by itself and, further transmits a simple authentication result request command.

At step S262, in response to reception of the simple authentication result request command, the controller 125 of the SD memory card B executes processing for simple authentication. Specifically, the controller 125 first reads in simple authentication information B stored in the storage.

At step S264, the controller 125 compares the simple authentication information A and the simple authentication information B. If the simple authentication information A and the simple authentication information B coincide, the controller 125 determines that authentication has succeeded.

On the other hand, if the simple authentication information A and the simple authentication information B do not coincide, the controller 125 determines that authentication has failed.

At step S266, as a response to the simple authentication result request command, the controller 125 notifies the control device 6a of the simple authentication result. If succeeded in authentication, at step S268, the controller 125 causes the SD memory card B to transition to writable state.

At step S154, the processing circuit 62 of the control device 6a determines whether simple authentication has succeeded, based on notification from the SD memory card B. If succeeded in authentication, processing goes to step S156, whereas if failed, processing goes to step S158.

At step S156, the processing circuit 62 transmits a write command and data to the SD memory card B at predetermined timing.

The controller 125 of the SD memory card B writes data into the SD memory card B at step S270, and counts up the counter 120c at step S272.

If failed in authentication, at step S158, the processing circuit 62 of the control device 6a deems access to the SD card prohibited and waits until the QR code authentication shown in FIG. 6, etc. with the authentication terminal 2 succeeds.

At step S274, the controller 125 of the SD memory card B on the other hand continues to deny access until the QR code authentication with the authentication terminal 2 succeeds.

According to the above simple authentication processing, it can be determined whether an SD memory card being mounted upon power on is an SD memory card that had been authenticated and used at the point of time when powered off most recently. If the SD memory cards being mounted upon power off and on are determined to be the same, the SD memory card can be caused to transition to the accessible state without going through the authentication processing that uses the authentication terminal 2. Thus, the manager of the factory 10 can simplify the authentication processing while verifying the authenticity of the SD memory card.

Note that notification of the simple authentication result at steps S266 and S154 is not essential. For example, after transmission of the simple authentication information A, the processing circuit 62 of the control device 6a may transmit, for trial, a command for write/read of any data to/from the SD memory card B. If received a notification reporting that data write/read was successfully made, from the SD memory card B, as a response to the command, the authentication can be determined to have succeeded.

The above example was an example where the simple authentication processing is performed between the control device 6a of the machine tool control system 6 and the SD memory card B inserted into the control device 6a. The simple authentication processing may be performed between the management PC 4 and the SD memory card B inserted into the management PC 4.

The processing in FIGS. 10 and 11 can be processing independent of the authentication processing that uses the authentication terminal 2, described with reference to FIGS. 1 to 9 in the present disclosure. Accordingly, the processing of FIGS. 10 and 11 is industrially applicable solely and it is not necessarily essential to be combined with FIGS. 1 to 9. In short, the processing of FIGS. 10 and 11 is widely applicable as a mechanism for validating that the SD memory card which had been mounted till power off is identical to the SD memory card which has already been mounted upon equipment on. That is, the present disclosure includes a determination method in which a recording medium is provided with a counter that is counted in one way every time a data write process is executed, and in which a device mounted with the recording medium has a storage device, wherein at timing when the recording medium is unmounted from the device, the recording medium saves simple authentication information generated at least from the counter, as first authentication information, into a non-user area of the recording medium and transmits the simple authentication information, as second authentication information, to the device, and wherein the device saves the second authentication information into the storage device. The present disclosure includes a determination method wherein at timing when the recording medium is mounted in the device, the second device transmits the second simple authentication information saved in the storage device to the recording medium, and wherein a controller 125 of the recording medium compares the first authentication information saved in the non-user area and the second authentication information received from the second device, and if coincident, determines the second recording medium as being authentic.

The exemplary embodiments have hereinbefore been described.

Although in the above description, the authenticity of the SD memory card B has been verified using the authentication terminal 2 within the factory 10, this is a mere example. Besides, the processing of the present disclosure may be utilized for the purpose that e.g., the business operator authenticates a user who paid for a particular contract or fee. More specifically, the business operator sends an SD memory card to only the user who paid a music concert fee. The SD memory card records therein the random number generation program 110a, the QR code generation and decoding programs 110b and 110c, the identification information 120a, and the one-way function 120b, shown in FIG. 5. Assume that the non-user area 120 stores seat information that indicates the location of the seats in a concert venue. The user heads for the concert venue with his/her own terminal, e.g., smartphone mounted with the SD memory card. In the concert venue, an attendant having the authentication terminal 2 authenticates the authenticity of the SD memory card. When the authenticity is verified, the user can access to his/her own seat information from the SD memory card, to display the location on the smartphone's screen. In this manner, by utilizing the fact of possessing an authorized SD memory card to authenticate the user who is its owner and read out the user's proper information, information can be presented to only the specific user.

Although in this specification, the SD memory card has been exemplarily described, the above description is applicable also to removable recording media based on other standards. A flash memory device such as e.g., compact flash (registered trademark) or memory stick (registered trademark) is available as the recording media based on other standards.

The present disclosure is applicable to a system that verifies the authenticity of a removable recording medium such as the SD card or the like offline,

What is claimed is:

1. A method for determining authenticity of a second recording medium mounted in a second device by using a first device mounted with a first recording medium,
the first device having a first imaging device and a first display device,
the second device having a second imaging device and a second display device, the first recording medium and the second recording medium each having:
a flash memory that has a user area in which a user is allowed to rewrite data, and a non-user area in which the user is not allowed to rewrite data; and
a controller that controls data write to and/or data read from the flash memory,
the non-user area of the first recording medium recording in advance first identification information and first algorithm data defining an arithmetic method, wherein
the controller of the first recording medium
(a) causes the first display device to display a first image pattern representing a given first variable value encoded in one or two dimensions;
(b) after display of the first image pattern, causes the first imaging device to capture a one- or two-dimensional second image pattern displayed on the second display device of the second device;
(c) decodes first code data from the second image pattern captured;
(d) utilizes the first algorithm data to perform arithmetic that uses the first identification information and the first variable value, to output first result data as an arithmetic result; and
(e) determines the second recording medium to be authentic in the case where the decoded first code data and the output first result data coincide.

2. The determination method of claim 1, wherein
in the case where the second recording medium records therein second identification information identical to the first identification information and second algorithm data identical to the first algorithm data, and
in the case where the controller of the second recording medium
(b1) decodes first variable value from the first image pattern;
(b2) utilizes the second algorithm data to perform arithmetic that uses the second identification information and the first variable value; and
(b3) generates the second image pattern from second result data as an arithmetic result,
at the step (e), the controller of the first recording medium determines the second recording medium to be authentic.

3. The determination method of claim 1, wherein
in the case where at the step (e), the controller of the first recording medium has determined the second recording medium to be authentic, the controller of the first recording medium transmits a command to permit access to the second recording medium, to a second terminal.

4. The determination method of claim 3, wherein
the command to permit access includes at least a command to permit write of data to the second recording medium, and wherein
after reception of the command to permit write, the controller of the second recording medium executes write of data to the flash memory.

5. The determination method of claim 2, wherein
in the case where at the step (e), the controller of the first recording medium has determined the second recording medium to be authentic, the controller of the first recording medium transmits a command to permit access to the second recording medium, to a second terminal.

6. The determination method of claim 5, wherein
the command to permit access includes at least a command to permit write of data to the second recording medium, and wherein
after reception of the command to permit write, the controller of the second recording medium executes write of data to the flash memory.

7. The determination method of claim 1, wherein
(f) at the step (e), the controller of the first recording medium having determined that the second recording medium to be authentic transmits a command causing to execute two-way authentication, to the second terminal;
the non-user area of the second recording medium recording in advance second identification information and second algorithm data defining an arithmetic method, and wherein
in response to reception of the command, the controller of the second recording medium
(g) causes the second display device to display a third image pattern representing a given second variable value encoded in one or two dimensions;
(h) after display of the third image pattern, causes the second imaging device to capture a one- or two-dimensional fourth image pattern displayed on the first display device of the first device;
(i) decodes second code data from the fourth image pattern captured;
(j) utilizes the second algorithm data to perform arithmetic that uses the second identification information and the second variable value, to output second result data as an arithmetic result; and
(k) determines the first recording medium to be authentic in the case where the second code data decoded at the step (i) and The second result data output at the step (j) coincide.

8. The determination method of claim 7, wherein
in the case where the controller of the second recording medium has determined the first recording medium to be authentic at the step (k), the controller of the first recording medium transmits a command to permit access to the second recording medium, to the second terminal.

9. The determination method of claim 8, wherein
after reception of the command, the second recording medium transmits to a state enabling data write to and/or data read from the flash memory.

10. The determination method of claim 1, wherein
the second recording medium comprises a counter that is counted in one way every time data write processing is executed, wherein
the second device comprises a storage device, wherein
at timing when mount of the second recording medium is cancelled from the second device after the second recording medium has been determined to be authentic, the second recording medium saves simple authentication information generated from at least a counter value, as first authentication information, into the non-user area, and transmits the simple authentication information, as second authentication information, to the second device, and wherein
the second device saves the second authentication information into the storage device.

11. The determination method of claim 10, wherein
at timing when the second recording medium is mounted in the second device, the second device transmits the second authentication information saved in the storage device, to the second recording medium, and wherein the controller of the second recording medium compares the first authentication information saved in the non-user area and the second authentication information received from the second device, and, if coincident, determines the second recording medium to be authentic.

12. The determination method of claim 1, wherein the first device is a mobile computer, and wherein the second device is a machine tool or a control device that controls the machine tool.

13. The determination method of claim 1, wherein the first recording medium is a memory card removable from the first device, and wherein the second recording medium is a memory card removable from the second device.

14. The determination method of claim 13, wherein the first recording medium and the second recording medium are SD memory cards.

15. The determination method of claim 1, wherein the first variable value is a random number generated by the controller of the first recording medium, wherein the first identification information is a fixed value recorded at time of manufacture or use of the first recording medium, and wherein the first algorithm is a one-way function.

16. The determination method of claim 7, wherein the second variable value is a random number generated by the controller of the second recording medium, wherein the second identification information is a fixed value recorded at time of manufacture or use of the second recording medium, and wherein the second algorithm is a one-way function.

17. A non-transitory computer-readable recording medium that is the first recording medium, the non-transitory computer-readable recording medium comprising instructions for a controller that executes the method of claim 1.

* * * * *